United States Patent
Petrusson

(10) Patent No.: US 12,122,461 B2
(45) Date of Patent: Oct. 22, 2024

(54) VEHICLE WING ASSEMBLIES AND SYSTEMS AND METHODS FOR MANIPULATING A VEHICLE WING ASSEMBLY

(71) Applicant: Volvo Car Corporation, Gothenburg (SE)

(72) Inventor: Jens Petrusson, Kungälv (SE)

(73) Assignee: Volvo Car Corporation, Gothenburg (SE)

( * ) Notice: Subject to any disclaimer, the term of this patent is extended or adjusted under 35 U.S.C. 154(b) by 354 days.

(21) Appl. No.: 17/573,785

(22) Filed: Jan. 12, 2022

(65) Prior Publication Data

US 2023/0219639 A1    Jul. 13, 2023

(51) Int. Cl.
  *B62D 35/00*   (2006.01)
(52) U.S. Cl.
  CPC .................................. *B62D 35/007* (2013.01)
(58) Field of Classification Search
  CPC ...... B62D 35/007; B62D 37/02; B64C 33/02; B64U 10/40
  See application file for complete search history.

(56) References Cited

U.S. PATENT DOCUMENTS

| | | | | |
|---|---|---|---|---|
| 1,352,679 | A * | 9/1920 | Myers | B62D 35/00 296/180.1 |
| 1,450,480 | A * | 4/1923 | Buck | B64C 33/02 244/22 |
| 4,558,898 | A * | 12/1985 | Deaver | B62D 35/007 296/180.1 |
| 5,288,039 | A * | 2/1994 | DeLaurier | B64C 3/52 244/90 R |
| 7,770,962 | B1 * | 8/2010 | Maxwell | B62D 35/007 296/180.5 |
| 9,216,823 | B2 * | 12/2015 | Matte | A63H 27/008 |
| 9,381,957 | B1 * | 7/2016 | Auden | B62D 37/02 |
| 10,457,339 | B2 * | 10/2019 | Virdie | B62D 35/007 |
| 10,926,814 | B2 * | 2/2021 | Virdie | B62D 37/02 |
| 11,208,160 | B1 * | 12/2021 | Welter | B62D 35/007 |
| 2002/0074826 | A1 * | 6/2002 | Presley | B62D 35/007 296/180.1 |

(Continued)

FOREIGN PATENT DOCUMENTS

CN   104340285 A  *  2/2015  ............. B62D 37/02
CN   111703512 A  *  9/2020

(Continued)

OTHER PUBLICATIONS

English translation of CN-212243597-U (Year: 2020).*
English translation of CN-111703512-A (Year: 2020).*

*Primary Examiner* — Lori Lyjak
(74) *Attorney, Agent, or Firm* — Christopher L. Bernard; Clements Bernard Walker

(57) ABSTRACT

Various disclosed embodiments include illustrative wing assemblies, wing systems, and methods. A wing assembly includes first drive cables, a flexible wing section, and a motor. The flexible wing section includes a flexible surface and frame members. One of the frame members is couplable to the first drive cables. The motor is couplable to a proximal end of the first drive cables and is configured to apply a longitudinal force to the drive cables. The applied force results in the flexible wing section curving in a predefined direction.

20 Claims, 10 Drawing Sheets

(56) References Cited

U.S. PATENT DOCUMENTS

| | | | | |
|---|---|---|---|---|
| 2005/0230546 | A1* | 10/2005 | McKnight | B60K 11/085 244/124 |
| 2007/0001481 | A1* | 1/2007 | Breidenbach | B62D 35/00 296/180.1 |
| 2008/0303310 | A1* | 12/2008 | Breidenbach | B62D 35/001 296/180.2 |
| 2009/0140542 | A1* | 6/2009 | Breidenbach | B62D 35/00 296/180.1 |
| 2009/0212594 | A1* | 8/2009 | Breidenbach | F16H 21/44 296/180.1 |
| 2011/0079677 | A1* | 4/2011 | Chronister | B64U 10/80 244/11 |
| 2012/0299330 | A1* | 11/2012 | Breidenbach | B62D 35/00 296/180.1 |
| 2015/0307191 | A1* | 10/2015 | Samuel | B64C 39/024 244/22 |
| 2015/0346723 | A1* | 12/2015 | Pedersen | G05D 1/0217 701/25 |
| 2019/0118873 | A1* | 4/2019 | Posch | B62D 35/007 |
| 2019/0322324 | A1* | 10/2019 | Hurst | B62D 35/007 |
| 2020/0198710 | A1* | 6/2020 | Grajek | B62D 29/04 |
| 2020/0406760 | A1* | 12/2020 | Fiello | F03D 9/32 |
| 2022/0315134 | A1* | 10/2022 | Moradnia | B62D 35/007 |
| 2022/0402564 | A1* | 12/2022 | Rose | B62D 37/02 |
| 2023/0132684 | A1* | 5/2023 | Fiello | B60L 8/006 290/44 |

FOREIGN PATENT DOCUMENTS

| | | | | |
|---|---|---|---|---|
| CN | 212243597 | U  * | 12/2020 | |
| DE | 2612954 | A  * | 9/1977 | B60R 9/05 |
| DE | 3711386 | A1 * | 10/1987 | |
| DE | 3838866 | A1 * | 5/1990 | |
| DE | 102005047113 | A1 * | 4/2007 | B62D 35/004 |
| DE | 102007003601 | A1 * | 7/2007 | B62D 35/007 |
| DE | 102013101689 | A1 * | 8/2014 | B62D 35/007 |
| DE | 102016102678 | A1 * | 8/2017 | |
| DE | 112016005655 | T5 * | 9/2018 | B62D 35/007 |
| DE | 102020116613 | B3 * | 8/2021 | B62D 35/007 |
| DE | 102020121382 | B3 * | 9/2021 | |
| DE | 102021112769 | A1 * | 11/2022 | |
| EP | 0982222 | A2 * | 3/2000 | |
| FR | 2862602 | A1 * | 5/2005 | B63B 1/107 |
| GB | 161084 | A  * | 4/1921 | |
| KR | 19990009696 | A  * | 2/1999 | |
| WO | WO-2010097216 | A2 * | 9/2010 | E05F 15/619 |

* cited by examiner

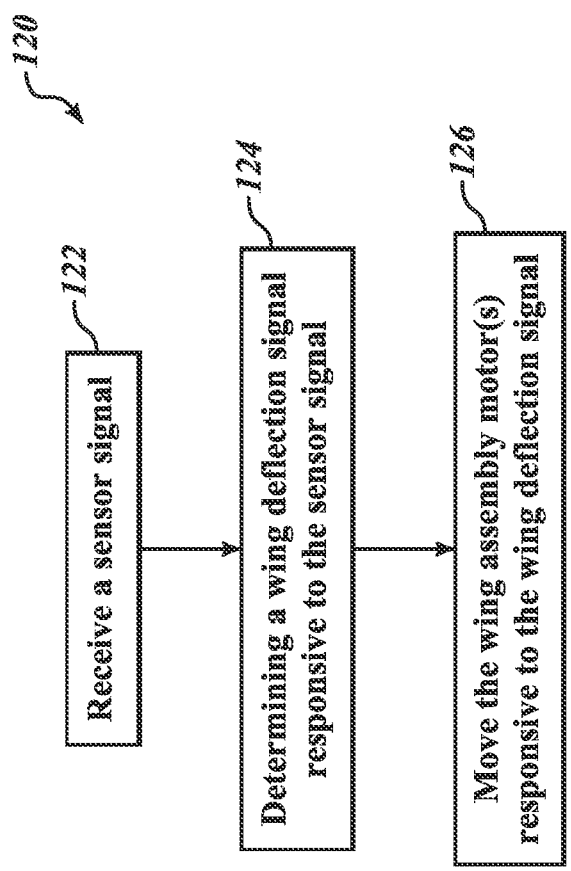

VEHICLE WING ASSEMBLIES AND SYSTEMS AND METHODS FOR MANIPULATING A VEHICLE WING ASSEMBLY

TECHNICAL FIELD

The present invention relates generally to vehicle wings. More specifically, the present invention relates to movable vehicle wing assemblies.

BACKGROUND ART

It is now common for vehicles (boats, planes, automobiles) to include wings or spoilers for generating forces from an experienced flow of a fluid, such as air or water. In many applications, the wings or spoilers have a fixed relationship to the corresponding vehicle and thus produce a consistent force to the vehicle due to the fixed relationship relative to the fluid flow. As such, a wing would provide a constant force for a turning vehicle where it may be more desirable to have an increased force applied to an inside turning side of the vehicle. It is therefore desirable to be able to control wing configuration for improving the generated forces. This is accomplished by the movable wing assembly(ies) provided herein.

SUMMARY

The wing assembly provided herein includes first drive cables, a flexible wing section, and a motor. The flexible wing section includes a flexible surface and frame members. One of the frame members is couplable to the first drive cables. The motor is couplable to a proximal end of the first drive cables and is configured to apply a longitudinal force to the drive cables. The applied force results in the flexible wing section curving in a predefined direction.

In another exemplary embodiment, a wing system includes a controller configured to generate a control signal and a wing assembly. The wing assembly includes first drive cables, a flexible wing section, and a motor. The flexible wing section includes a flexible surface and frame members. One of the frame members is couplable to the one or more first drive cables. The motor is couplable to a proximal end of the first drive cables. The motor is configured to apply a longitudinal force to the first drive cables responsive to the control signal.

In another exemplary embodiment, a method generates a wing control signal, sends the wing control signal to a motor(s) inside a wing assembly, and the motor transmits a force to a distal frame member of unhinged frame members within a flexible section of the wing assembly.

It will be readily apparent to those of ordinary skill in the art that different numbers and configurations of movable wing assemblies could be used equally and provide different motion control functions.

The foregoing summary is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

The present invention is illustrated and described herein with reference to the various drawings, in which like reference numbers are used to denote like assembly components/algorithm steps, as appropriate, and in which:

FIG. 10 is a flow diagram of an illustrative method performed a movable wing system.

DETAILED DESCRIPTION OF EMBODIMENTS

Various disclosed embodiments include illustrative wing assemblies, wing systems, and methods.

A wing assembly provided herein includes drive cables, a flexible wing section, and a motor. The flexible wing section includes a flexible surface and unhinged frame members. One of the frame members is couplable to the drive cables. The motor is coupled to a proximal end of the drive cables. The motor is configured to apply a longitudinal force to the drive cables, thus causing the frame members and the flexible surface to deflect in a predefined direction, thereby changing the aerodynamic properties of the wing assembly.

In most of the examples provided herein, the flexible wing assembly and a wing control system are illustrated and described. The motor of the wing assembly is controlled by a controller, which instructs the motor to warp the flexible wing assembly according to current or predicted road geometry, vehicle conditions, and/or user instructions. The motor applies a force to some or all of the drive cables according to the instructions provided by the controller.

It will be readily apparent to those of ordinary skill in the art that different numbers and configurations of flexible wing assemblies could be used equally and provide different wing pitch and/or camber changing functions. For example, the concepts provided herein could apply to a wing assembly for use in aviation, aquatic, automotive, or other applications where changing/controlling the force produced by the wing assembly would be beneficial.

Figure 1:
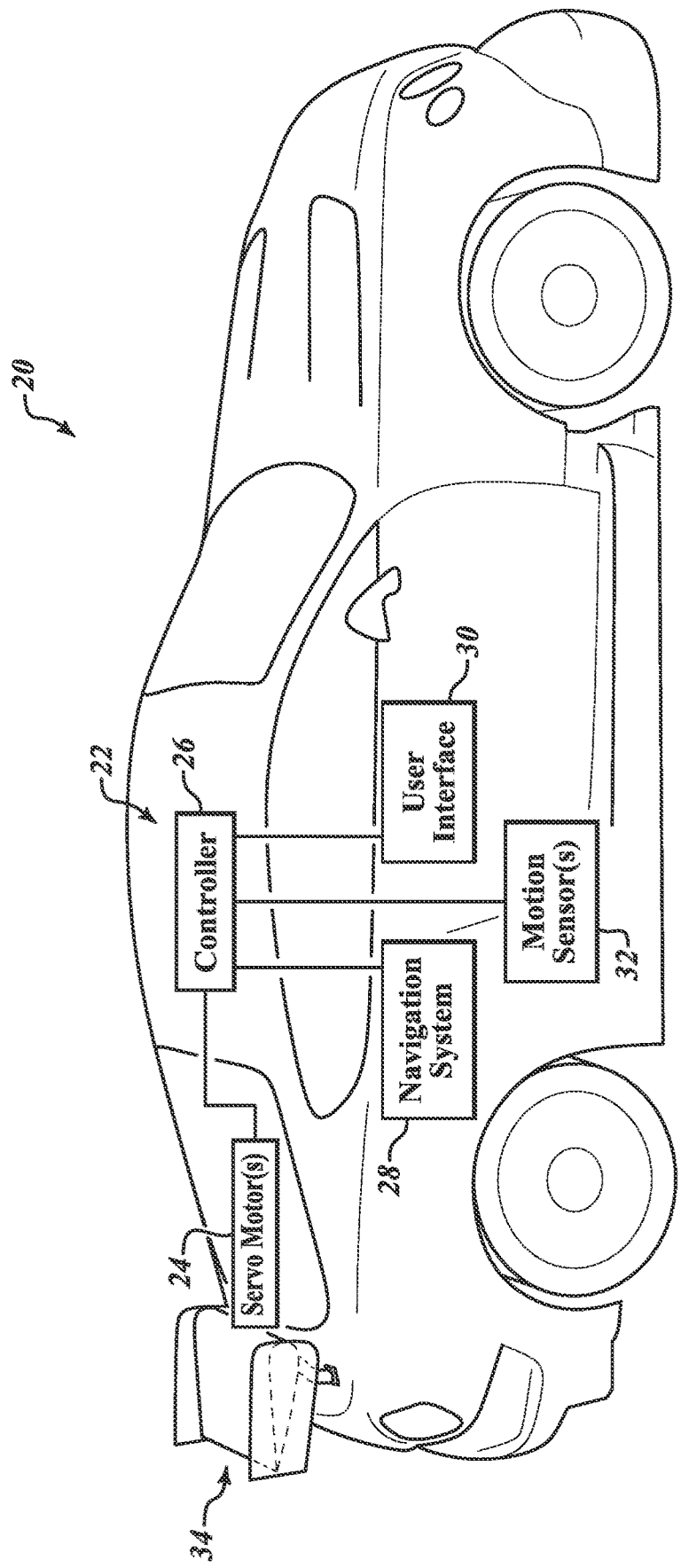
FIG. 1 is a partial schematic, perspective view of one exemplary embodiment of a vehicle with a movable wing system.

Referring now specifically to FIG. 1, in one exemplary embodiment, a vehicle 20 includes a movable wing system 22. The movable wing system 22 includes a flexible controllable wing assembly 34, one or more motor(s) 24 included within the flexible controllable wing assembly 34, and a controller 26. Also, the movable wing system 22 may include one or all of a navigation system 28, a user interface 30, and a motion sensor(s) 32. The controller 26 receives signals from the navigation system 28, the user interface 30, and/or the motion sensor(s) 32, determines a control signal for the motor(s) 24 responsive to the received signals, and sends the determined control signal to the motor(s) 24. Control signal determination will be described in more detail below.

Referring now specifically to FIGS. 2-6, in the exemplary embodiment, the wing assembly 34 includes a motor compartment 50 having a leading edge 42. The motor compartment 50 is attached via support struts 40 to the vehicle 20. A flexible section 52 is located distal from the motor compartment 50. The motor compartment 50 may include four motors 24—two that separately control cable bars 62 and two that separately control cable bars 64. The drive cables 66 attach to the cable bars 62 and the drive cables 86 attach to the cable bars 64. The drive cables 66 and 86 pass through a distal wall of the motor compartment 50 into the flexible section 52. The flexible section 52 includes a distal frame member 70, a plurality of first frame members 74, 76, 78, and 80, and a plurality of second frame members 88. One of the first drive cables 66 is slidably received through each of the first frame members 74, 76, 78, and 80 along a common longitudinal path. The first drive cables 66 are attached at a distal end to the distal frame member 70. Another of the first drive cables 66 is also slidably received through on of the second frame members 88 A flexible surface 44 is applied over at least a portion of the motor compartment 50 and the flexible section 52 and is attached to at least a top surface of the motor compartment 50 and top surfaces of the frame members 70, 74, 74, 78, 80, and 88.

In this exemplary embodiment, the first frame members 74, 76, 78, and 80 are unattached to each other, the motor compartment 50, or the distal frame member 70. The first frame members 74, 76, 78, and 80 may be attached to the underside of the flexible surface 44. The first frame members 74, 76, 78, and 80 are configured to allow the flexible section 52 to flex in a direction different than a longitudinal axis of the wing assembly 34. The longitudinal axis is approximately perpendicular to a plane of the leading edge 42.

Figure 2:
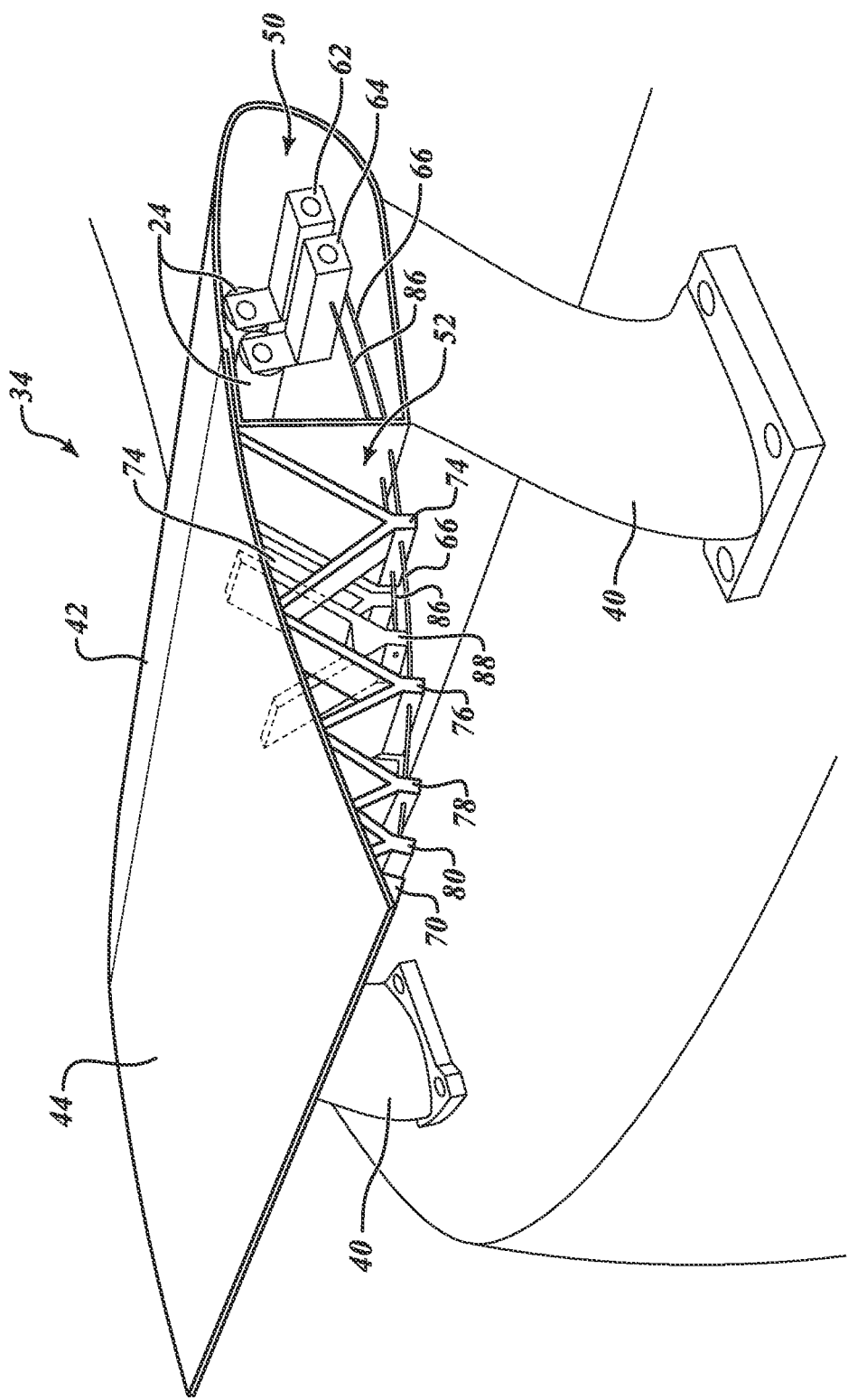
FIG. 2 is a perspective view of a partially opened wing assembly of the wing system of FIG. 1.
Figure 3:
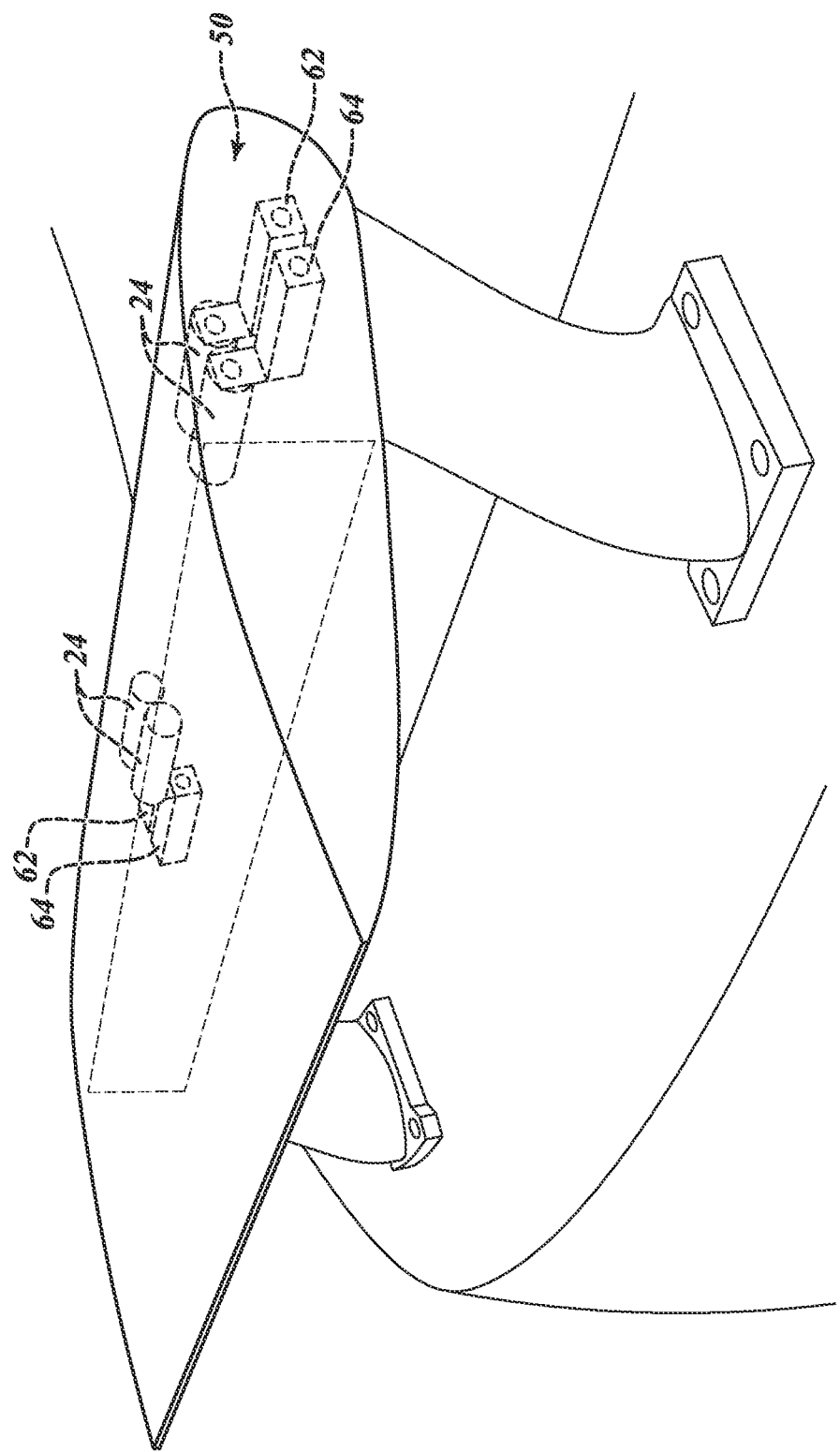
FIG. 3 is an x-ray view of some of the components in a section of the wing assembly of FIG. 2.
Figure 4:
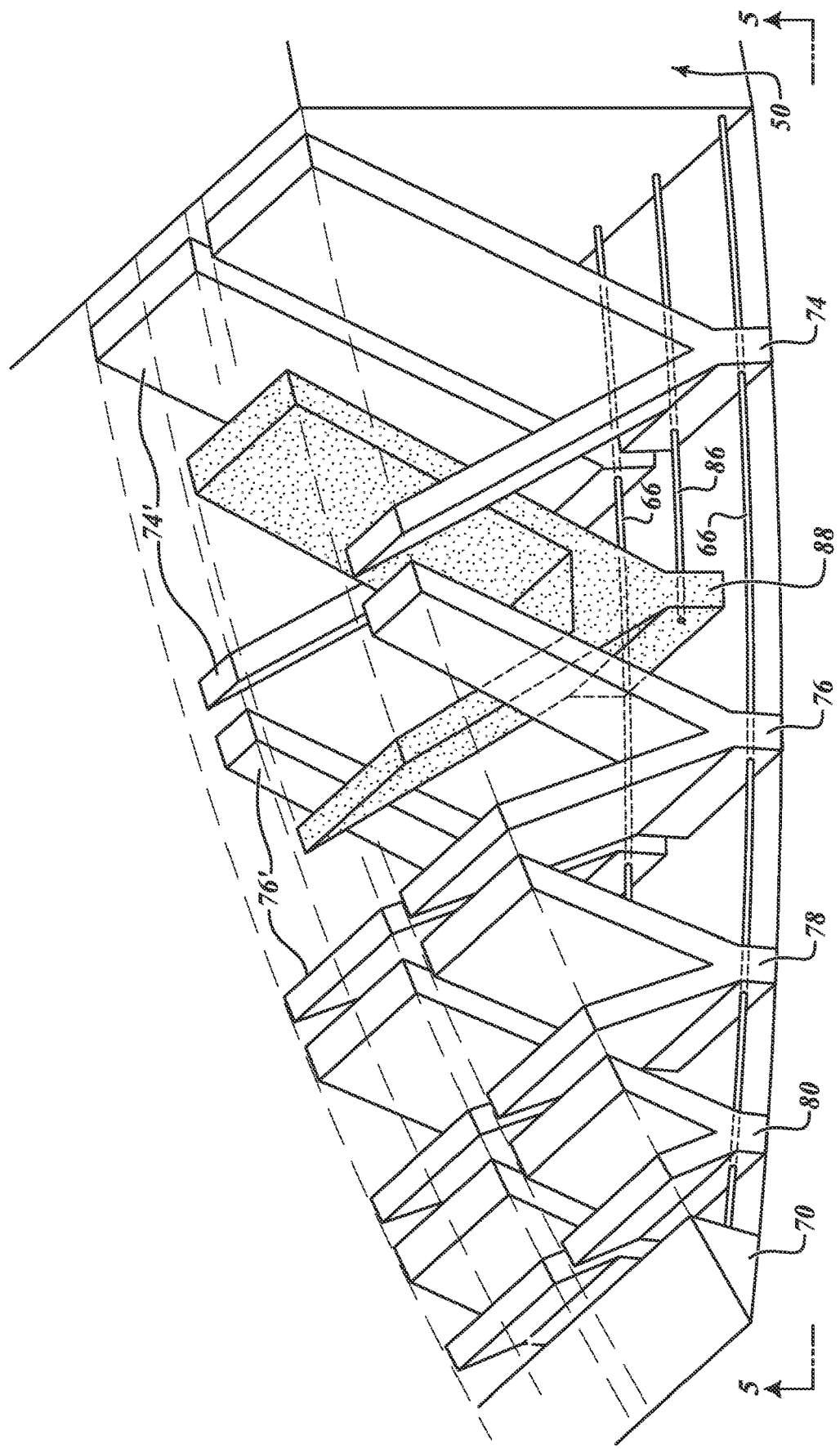
FIG. 4 is a partial expanded perspective view of rows of adjacent frame members of the wing assembly of FIG. 2.
Figure 5:
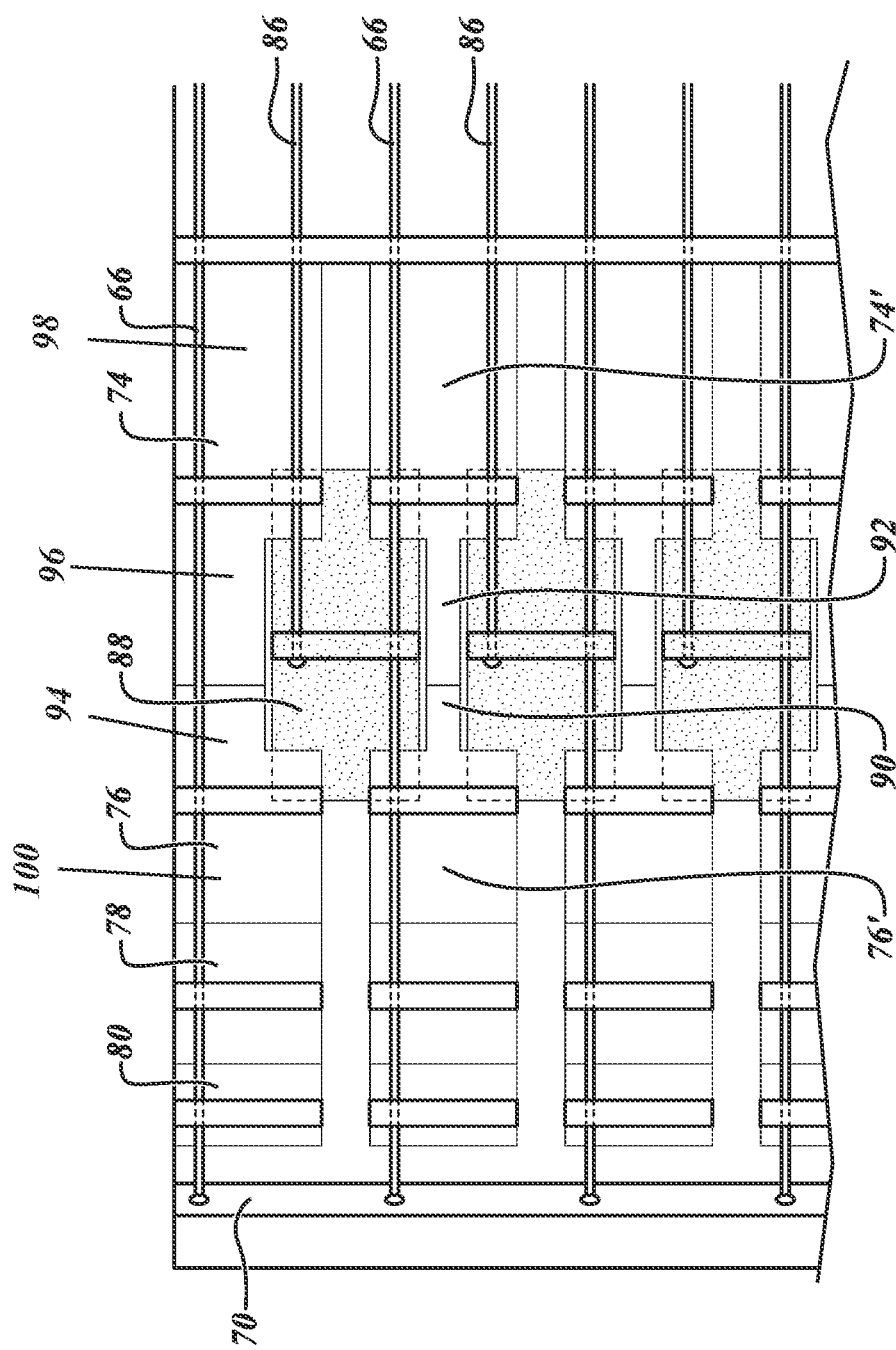
FIG. 5 is a partial underside, perspective view of components of the wing assembly of FIG. 2.
Figure 6:
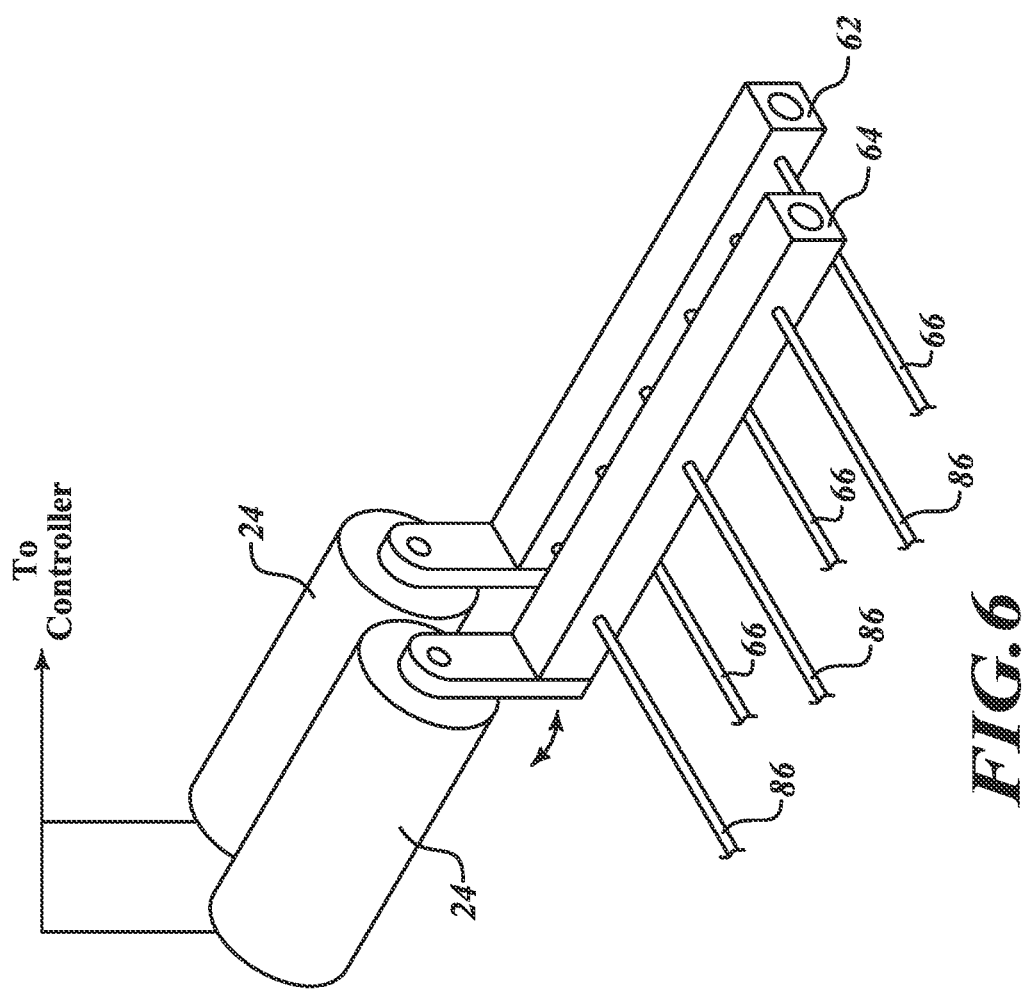
FIG. 6 is a partial perspective view of components in a motor compartment of the wing assembly of FIG. 2.
Figure 7:
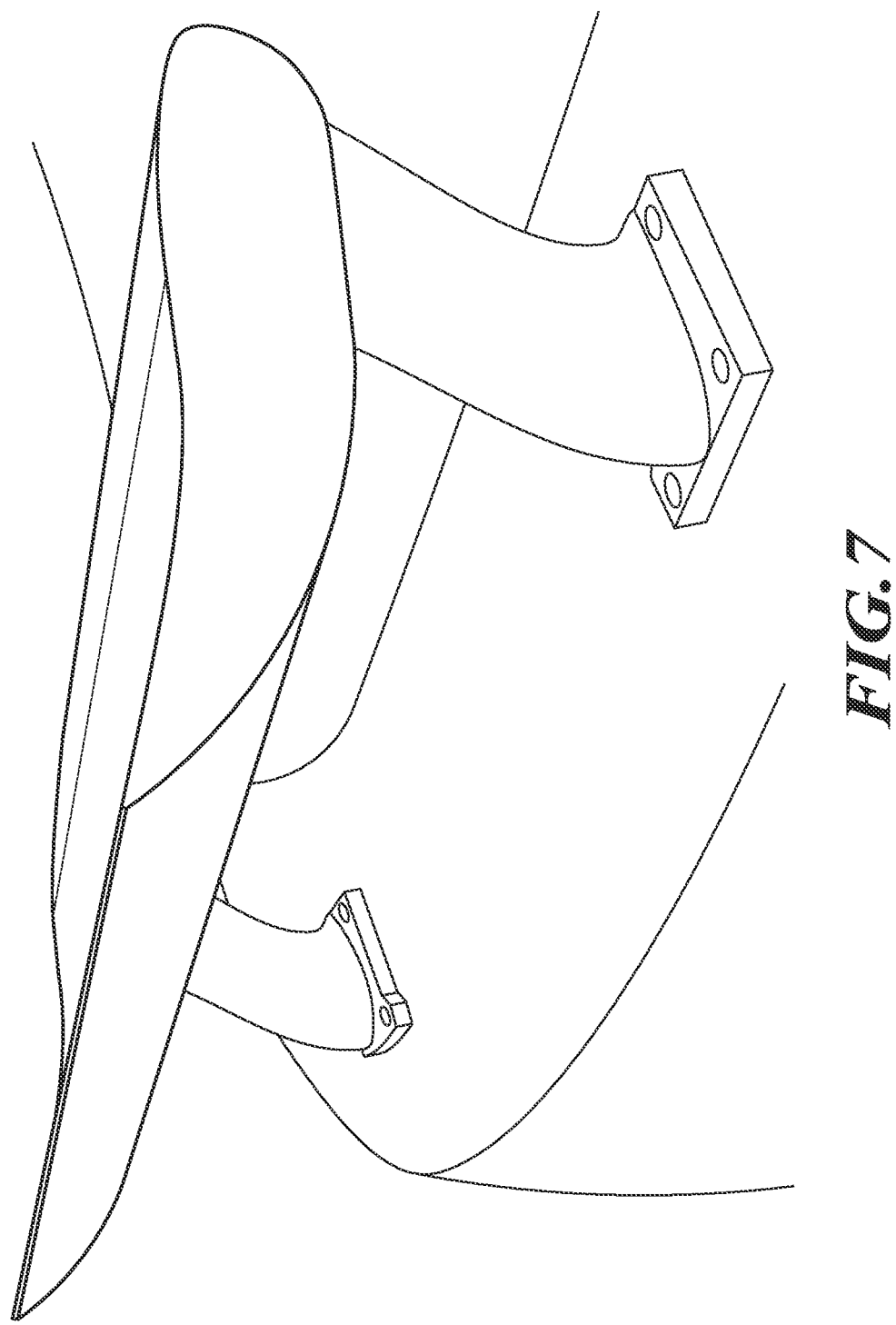
FIG. 7 is a perspective view of the wing assembly of FIG. 2 in upward curved configuration.

In the illustrative embodiment, the frame members 74, 76, 78, 80, and 88 are Y or V-shaped having a proximal arm and a distal arm connected to a base. The frame members 74, 76, 78, 80, and 88 may be bonded to the flexible surface 44 at a top edge of the proximal and distal arms. Due to the shape of the frame members 74, 76, 78, 80, and 88 and the base not being connected to any material that is connected to the distal frame member 70 or the motor compartment 50, the bases of each of the frame members 74, 76, 78, 80, and 88 will rotate about a crosswise axis that is perpendicular to a longitudinal axis as a distal force is applied to the first drive cable 66 and thus the distal frame member 70 and to the second drive cable 86 and thus the second frame member 88. The result is that the frame members 74, 76, 78, 80, and 88 will support the flexible surface 44 as the flexible section 52 curves upward. The shape of the wing assembly 34 will change from a neutral position, as shown in FIG. 2, to an upward curve position, such as that shown in FIG. 7. The wing assembly 24 with an upward curve configuration produces an increased Bernoulli force pointing down.

In various embodiments, the first frame members 74, 76, 78, and 80 are reduced in size as they progress aft towards the distal frame member 70. The size of the first frame members 74, 76, 78, 80 and the distal frame member 70 are selected to produce a desired shape for the wing assembly 24.

Figure 9:
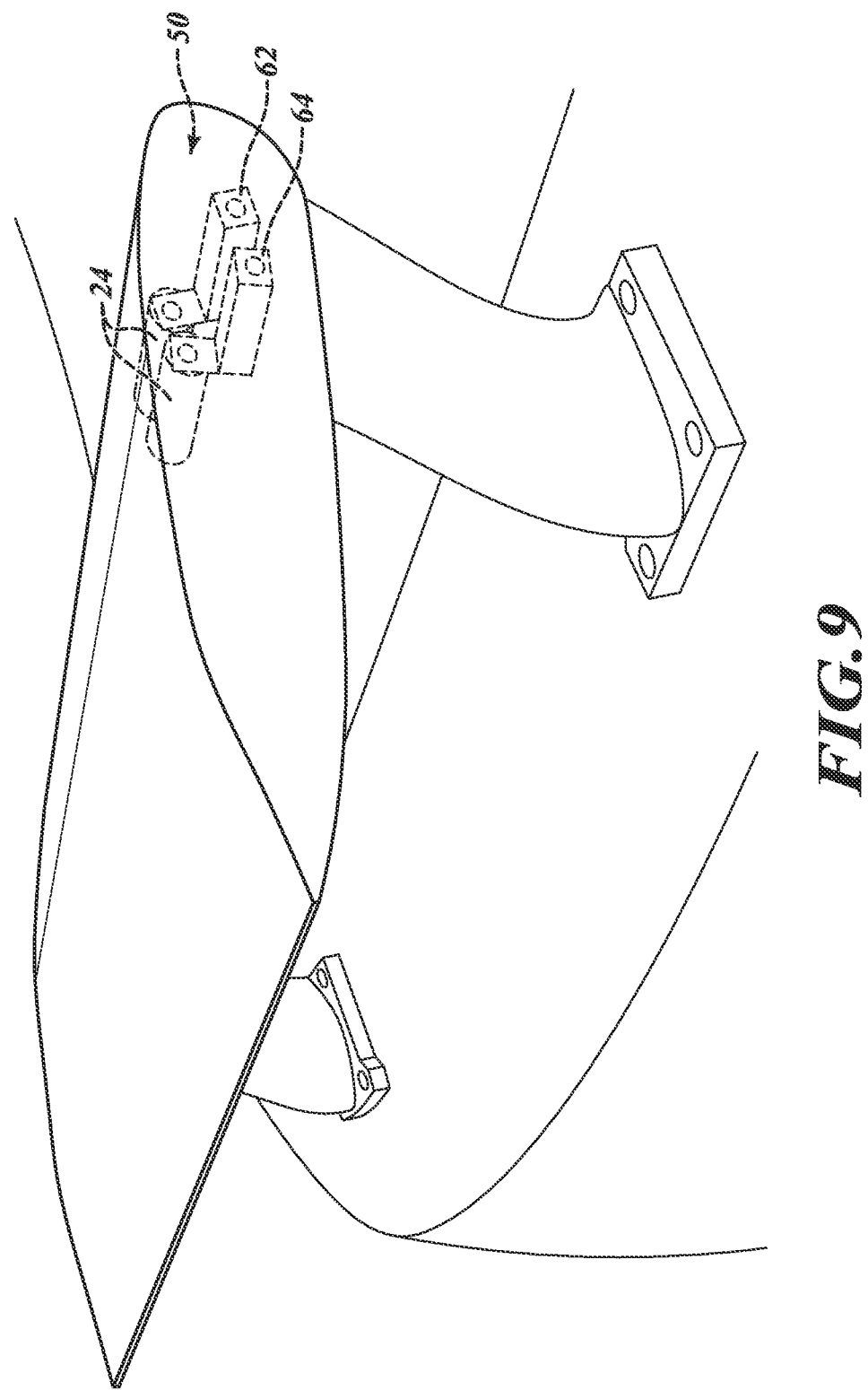
FIG. 9 is a perspective view of the wing assembly of FIG. 2 in an increased camber configuration.

In this exemplary embodiment, the second frame member 88 may be located between rows of longitudinally separate first frame members 74, 76, 78, and 80. The frame members 74, 76, 78, 80, and 88 may have other shapes that allow for flexible motion as described above. The second drive cable 86 is slidably received through the base of a first one of the first frame members 74 and is attached to the base of the second frame member 88. The second drive cable 86 is connected at a proximal end to the second drive cable bar 64. The second drive cable bar 64 may be connected to a second motor 24 that is connected to the controller 26. The application of the distal force of the second drive cable 86 via the drive cable bar 64 and the respective motor 24 causes the second frame member 88 to rotate about a crosswise axis that is perpendicular to the longitudinal axis. The result is a force applied by the distal arm of the second frame member 88 upon the flexible surface 44. This force causes a change in camber of the wing assembly 34, see FIG. 9. An increase in the camber of the wing assembly 34 correlates with an increase in a vertical Bernoulli force generated by the wing assembly 34.

In various embodiments, the second frame member 88 overlaps adjacent rows of the first frame members 74, 76, 78, and 80. In the illustrative embodiment, the first most proximal frame members 74, 74' and the second most proximal frame members 76, 76' of adjacent rows have been altered to allow the second frame member 88 to overlap outer edges of the adjacent rows of the first frame members 74, 76, 78, and 80. The distal arms 92, 96 of the most proximal frame members 74, 74' in the adjacent rows have smaller width dimensions than the proximal arms 98 of the most proximal frame members 74. The proximal arms 90, 94 of the second most proximal frame members 76, 76' in the adjacent rows have smaller width dimensions than the distal arms 100 of the second most proximal frame members 76. The distal and proximal arms of the second frame member 88 are received within gaps between the distal arms 92, 96 of the adjacent most proximal frame members 74, 74' and proximal arms 90, 94 of the adjacent second most proximal frame members 76, 76'.

Figure 8:
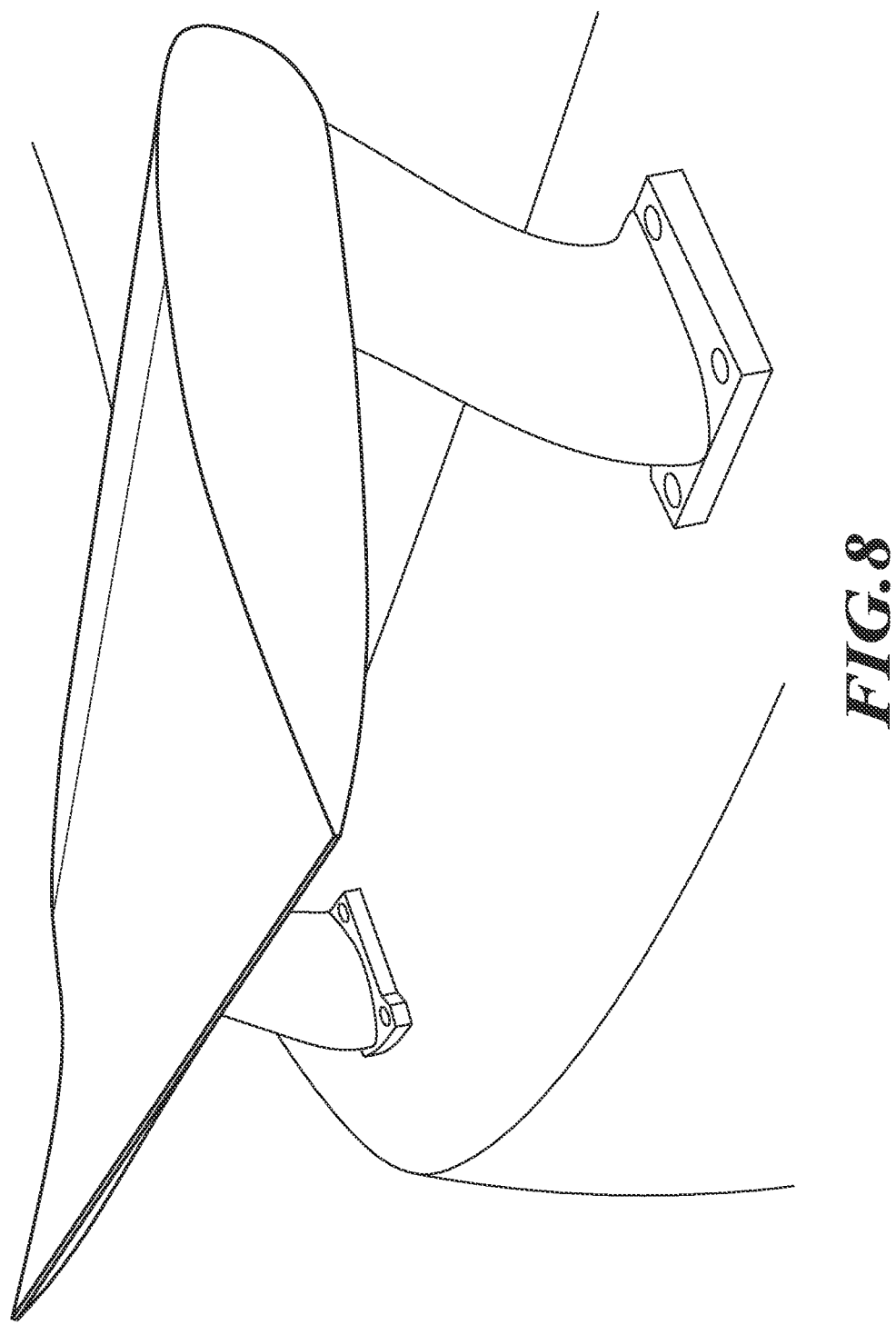
FIG. 8 is a perspective view of the wing assembly of FIG. 2 in twisted configuration.

In various embodiments, the wing assembly 34 may include multiple motors 24 configured to separately control drive cables 66 and 86 at different sections of the flexible section 52. This allows the different sections to have different forces applied to different frame members, thereby resulting in differing curve values of the shape of the wing assembly 34. The result of the flexible section 52 having different sections with differing curve values produces different forces onto the struts 30 and thus different forces on to different parts of the vehicle 20, thereby resulting in a twist of the wing assembly 34, see FIG. 8.

In various embodiments, the wing assembly 34 may include one or more pieces of stretchable material attached to a bottom side of the wing assembly 34. The applied material may be attached to the motor compartment 50 and the distal frame member 70, but is not attached to both the motor compartment 50 or the distal frame member 70 and the other frame members 74, 76, 78, 80, and 88. This allows the frame members 74, 76, 78, 80, and 88 to move free as opposed to being connected to the motor compartment 50 or the distal frame member 70. The wing assembly 34 may include layered sections of material attached to a bottom side of the wing assembly 34. Individual sections of the layered sections of material may be separately attached in an overlapping configuration to each of the motor compartment 50, the distal frame member 70, and one or more of the frame members 74, 76, 78, 80, and 88.

Given by way of non-limiting example, in various embodiments, the motors 24 may include electric or hydraulic linear or rotational servomotors or pistons with linear or rotational encoders for determining position of the servomotors or pistons. Servomotors and pistons are well known in the art and no further explanation is necessary for a person of skill in the art to understand the disclosed subject matter.

Given by way of non-limiting example, in various embodiments, the drive cables 66 and 86 may be made of a number of different materials capable of flexing in the desired direction of the wing assembly 34 while providing adequate column strength for transmitting force from the motor 24 and the drive cable bars 62 and 64 to the distal frame member 70 and the second frame members 88. Example materials used for the drive cables 66 and 86 may be metals, molded/extruded thermoplastics, glass fibers, or comparable materials.

Given by way of non-limiting example, in various embodiments, the flexible surface 44 may be made of a flexible durable material capable of allowing smooth flow of a fluid (e.g., air, water) and be flexible while being attached to the motor compartment 50 and the frame members 70-80 and 88. The flexible surface 44 may be made of a composite material, such as carbon fiber, biaxially-oriented polyethylene terephthalate, a heat-resistant para-aramid synthetic fiber, and/or comparable materials.

Given by way of non-limiting example, in various embodiments, the frame members 70, 74, 76, 78, 80, and 88 may be made of any material capable of maintaining its shape within the flexible section 52. The frame members 70, 74, 76, 78, 80, and 88 may be made of a metal, a molded or 3-D printed thermoplastic, or comparable materials.

In various embodiments, the navigation system 28 may provide current or upcoming road information, such as, without limitation, curvature, bank angle, or similar information. The user interface 30 may provide wing curvature instructions or position information instructions. The motion sensor(s) 32 may provide vehicle status information, such as roll or pitch angle, speed information, steering wheel position, or similar information. Some or all of the information provided by the navigation system 28, the user interface 30, and the sensor(s) 32 may be used by the controller 26 to determine whether the wing assembly 34 should alter its configuration for producing more or less forces needed by the vehicle 20. For example, as the vehicle 20 accelerates the controller 26 determines that more force needs to be applied to the rear wheels. Thus, the controller 26 will instruct the wing assembly 34 to alter its configuration in order to produce a greater downward force, see FIG. 7.

In another example, the controller 26 determines that the vehicle 20 is traveling at a high speed and is about to make a turn based on navigation or sensor information and thus will instruct the wing assembly 34 to produce a greater downward force on one side of the wing assembly 34, such as the inward turning side of the vehicle 20. The instruction produced by the controller 26 to increase force on one side of the wing assembly 34 causes the wing assembly 34 to twist in such a manner that the side of the wing assembly 34 closest to the inward turning side of the vehicle 20 will produce a greater downward force than the side of the wing assembly 34 closest to the outward turning side of the vehicle 20, see FIG. 8.

Given by way of non-limiting example, in various embodiments, the vehicle 20 may be any motor powered or gravity powered vehicle. For example and given by way of non-limiting examples, in various embodiments, the vehicle may include a motor vehicle driven by wheels and/or tracks, such as, without limitation, an automobile, a truck, a sport utility vehicle (SUV), a van, and the like. Given by way of further non-limiting examples, in various embodiments, the vehicle 20 may include a marine vessel such as, without limitation, a boat, a ship, a submarine, a submersible, an autonomous underwater vehicle (AUV), and the like. Given by way of further non-limiting examples, in various embodiments, the vehicle 20 may include an aircraft such as, without limitation, a fixed wing aircraft, a rotary wing aircraft, and a lighter-than-air (LTA) craft.

In various embodiments and given by way of example only and not of limitation, the navigation system 28 may include, without limitation, a global positioning system (GPS) device, a global navigation satellite system (GNSS), or the like. The navigation system 28 produces navigation information, such as, without limitation, upcoming road condition information, location on roads of a map, and the like. The navigation information is sent to the controller 26 for analysis. Navigation and mapping systems are well known in the art and no further explanation is necessary for a person of skill in the art to understand the disclosed subject matter.

In various embodiments and given by way of example only and not of limitation, the user interface 30 may include mechanical control devices, such as a joystick or a switch, graphical user interface components, voice actuation devices, or the like. The user interface 30 allows a user to select a desired wing configuration by how they operate the user interface 30. User interface devices are well known in the art and no further explanation is necessary for a person of skill in the art to understand the disclosed subject matter.

In various embodiments and given by way of example only and not of limitation, the sensor(s) 32 may include one or a combination of different types of sensors. The sensor(s) 32 may provide vehicle information that might benefit from a change in force supplied by the wing assembly 24. Sensors, such as, without limitation, gyroscopes, accelerometers, or the like, are well known in the art and no further explanation is necessary for a person of skill in the art to understand the disclosed subject matter.

Referring additionally to FIG. 10, in various embodiments an illustrative process 120 is provided for controlling a wing assembly having one or more motors for altering the shape of the wing assembly. First, at a block 122, a signal is received at a controller. The signal may be received from various sources, such as, without limitation, a navigation system, a vehicle sensor(s), a user control device, or comparable sources. At a block 124, the controller determines a wing deflection signal responsive to the signal. The signal may include values that the controller determines would need a response from the wing assembly in the form of increased or decreased downward force produced by the wing assembly. At a block 126, the wing assembly motor(s) responds to the wing deflection signal. The wing deflection signal may cause the wing assembly motor(s) to deflect the wing assembly a certain number of degrees in order to place the wing assembly in a configuration for producing a Bernoulli force counter or responsive to the signal.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller/processor, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In one or more examples, the functions described herein may be implemented in hardware, software, firmware, or any combination thereof. If implemented in software, the functions may be stored or transmitted as one or more instructions or code on a computer-readable medium and executed by a hardware-based processing unit. Computer-readable media may include computer-readable storage media, which corresponds to a tangible medium, such as data storage media, or communication media, including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can include random-access memory (RAM), read-only memory (ROM), electrically erasable programmable read-only memory (EEPROM), compact disc read-only memory (CD-ROM), or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies, such as infrared, radio, and microwave, then the coaxial cable, fiber optic cable, twisted pair, DSL, or wireless technologies, such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Although the present invention is illustrated and described herein with reference to referred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

The invention claimed is:

1. A wing assembly comprising:
    one or more first drive cables;
    a flexible wing section comprising:
        a flexible surface; and
        a plurality of frame members, wherein one of the plurality of frame members is couplable to the one or more first drive cables; and
    a motor couplable to a proximal end of the one or more first drive cables, wherein the motor is configured to apply a longitudinal force to the one or more first drive cables.

2. The wing assembly of claim 1, wherein the plurality of frame members comprises:
    a distal frame member couplable to a distal end of the one or more drive cables; and
    one or more proximal frame members.

3. The wing assembly of claim 2, wherein the flexible surface is attachable to the plurality of frame members.

4. The wing assembly of claim 3, wherein one of the one or more drive cables is slidably receivable within the one or more proximal frame members.

5. The wing assembly of claim 4, wherein the one or more proximal frame members includes a proximal arm having a top surface couplable to the flexible surface and a distal arm having a top surface couplable to the flexible surface.

6. The wing assembly of claim 5, wherein one or more of the one or more drive cables is slidably receivable through a plurality of the proximal frame members in a longitudinal direction.

7. The wing assembly of claim 6, wherein one of the proximal frame members distal from another one of the proximal frame members, both located along the same longitudinal direction, is smaller than the next more proximal frame member.

8. The wing assembly of claim 1, further comprising:
one or more second drive cables;
a second motor couplable to a proximal end of the one or more second drive cables; and
one or more second frame members comprising:
  a proximal arm couplable to the flexible surface; and
  a distal arm couplable to the flexible surface,
  wherein the distal arm is couplable to one of the one or more second drive cables and the proximal arm is configured to slidably receive one of the one or more second drive cables.

9. A wing system comprising:
a controller configured to generate a control signal; and
a wing assembly comprising:
  one or more first drive cables;
  a flexible wing section comprising:
    a flexible surface; and
    a plurality of frame members, wherein one of the plurality of frame members is couplable to the one or more first drive cables; and
  a motor couplable to a proximal end of the one or more first drive cables, wherein the motor is configured to apply a longitudinal force to the one or more first drive cables responsive to the control signal.

10. The wing system of claim 9, wherein the plurality of frame members comprises:
a distal frame member couplable to a distal end of the one or more drive cables; and
one or more proximal frame members.

11. The wing system of claim 10, wherein the flexible surface is attachable to the plurality of frame members.

12. The wing system of claim 11, wherein one of the one or more drive cables is slidably receivable within the one or more proximal frame members.

13. The wing system of claim 12, wherein the one or more proximal frame members includes a proximal arm having a top surface couplable to the flexible surface and a distal arm having a top surface couplable to the flexible surface.

14. The wing system of claim 13, wherein one or more of the one or more drive cables is slidably receivable through a plurality of the proximal frame members in a longitudinal direction.

15. The wing system of claim 14, wherein one of the proximal frame members distal from another one of the proximal frame members, both located along the same longitudinal direction, is smaller than the next more proximal frame member.

16. The wing system of claim 9, wherein the wing assembly further comprises:
one or more second drive cables;
a second motor couplable to a proximal end of the one or more second drive cables; and
one or more second frame members comprising:
  a proximal arm couplable to the flexible surface; and
  a distal arm couplable to the flexible surface,
  wherein the distal arm is couplable to one of the one or more second drive cables and the proximal arm is configured to slidably receive one of the one or more second drive cables.

17. The wing system of claim 9, further comprising:
a sensor device configured to provide a sensor signal to the controller,
wherein the controller is further configured to generate the control signal responsive to the sensor signal.

18. The wing system of claim 17, wherein the sensor signal includes information chosen from navigation information, user control information, and vehicle information.

19. A method comprising:
generating a wing control signal;
sending the wing control signal to one or more motors inside a wing assembly; and
transmitting a force from the one or more motors to a distal frame member of a plurality of unhinged frame members within a flexible section of the wing assembly via one or more first drive cables coupled to the one or more motors.

20. The method of claim 19, further comprising:
transmitting a force from the one or more motors to a frame member coupled to a flexible surface of the wing assembly proximal from the distal frame member.

* * * * *